United States Patent [19]
Utsu et al.

[11] Patent Number: 5,311,186
[45] Date of Patent: May 10, 1994

[54] TRANSPONDER FOR VEHICLE IDENTIFICATION DEVICE

[75] Inventors: Jyunshi Utsu, Nishio; Masao Kodera, Okazaki; Kunihiko Sasaki, Aichi, all of Japan

[73] Assignee: Nippon Soken, Inc., Nishio, Japan

[21] Appl. No.: 71,619

[22] Filed: Jun. 4, 1993

Related U.S. Application Data

[63] Continuation of Ser. No. 588,994, Sep. 26, 1990, abandoned.

[30] Foreign Application Priority Data

Sep. 27, 1989 [JP] Japan .................. 1-251626

[51] Int. Cl.⁵ .................................. G01S 13/80
[52] U.S. Cl. ................................ 342/51; 342/44
[58] Field of Search ............... 342/44, 42, 43, 46, 342/50, 51

[56] References Cited

U.S. PATENT DOCUMENTS

| | | | |
|---|---|---|---|
| 3,745,569 | 7/1973 | Works et al. | 342/44 |
| 3,754,250 | 8/1973 | Bruner | 342/44 |
| 3,855,592 | 12/1974 | Davis et al. | 342/44 |
| 3,914,762 | 10/1975 | Klensch | 342/44 |
| 3,918,057 | 11/1975 | Van Tol | 342/51 |
| 3,945,006 | 3/1976 | Cleeton | 342/45 |
| 3,967,202 | 6/1976 | Batz | 342/42 |
| 4,015,259 | 3/1977 | Siverhus et al. | 342/44 |
| 4,019,181 | 4/1977 | Olsson et al. | 342/42 |
| 4,040,053 | 8/1977 | Olsson | 342/42 |
| 4,068,232 | 1/1978 | Meyers et al. | 342/44 |
| 4,075,632 | 2/1978 | Baldwin et al. | 342/51 |
| 4,104,630 | 8/1978 | Chasek | 342/44 |
| 4,114,151 | 9/1978 | Denne et al. | 342/44 |
| 4,242,663 | 12/1980 | Slobodin | 342/44 X |
| 4,303,904 | 12/1981 | Chasek | 342/44 X |
| 4,345,253 | 8/1982 | Hoover | 342/44 |
| 4,364,043 | 12/1982 | Cole et al. | 342/44 X |
| 4,556,883 | 12/1985 | Strietzel | 342/44 X |
| 4,598,275 | 7/1986 | Clive et al. | 340/573 |
| 4,609,922 | 9/1986 | Boegli et al. | 342/42 X |
| 4,703,327 | 10/1987 | Rossetti et al. | 342/44 |
| 4,724,427 | 2/1988 | Carroll | 340/572 |
| 4,739,328 | 4/1988 | Koelle et al. | 342/44 |
| 4,786,907 | 11/1988 | Koelle | 343/51 |
| 4,908,627 | 3/1990 | Santos | 342/125 |
| 4,937,581 | 6/1990 | Baldwin et al. | 342/44 |
| 4,963,887 | 10/1990 | Kawashima et al. | 342/44 |
| 5,001,486 | 3/1991 | Bächtiger | 342/42 |

FOREIGN PATENT DOCUMENTS

| | | |
|---|---|---|
| 0125143 | 5/1984 | European Pat. Off. . |
| 0324564 | 1/1989 | European Pat. Off. . |
| 2624677 | 6/1989 | France . |
| 55-11621 | 1/1980 | Japan .................. H03D 1/10 |
| 57-159180 | 10/1982 | Japan .................. G01S 13/74 |
| 59-219001 | 12/1984 | Japan .................. H01P 1/00 |
| 61-201179 | 9/1986 | Japan .................. G01S 13/80 |
| 63-161701 | 7/1988 | Japan .................. H01P 1/15 |
| 8911701 | 11/1989 | PCT Int'l Appl. . |

Primary Examiner—John B. Sotomayor
Attorney, Agent, or Firm—Cushman, Darby & Cushman

[57] ABSTRACT

The invention relates to a transponder for a vehicle identification device in which a radio wave including vehicle information returned from transponders provided in a vehicle is received by an interrogator. The vehicle transponder receives a query radio wave and uses a detection device to generate a previously memorized coded signal train in response to a received wave. The coded signal train varies an amount of bias voltage of the detection device so that a reflection coefficient of the detection device is varied to modulate the reflection wave of the query radio wave and the modulated wave is transmitted back to the interrogator.

10 Claims, 7 Drawing Sheets

TRANSPONDER FOR VEHICLE IDENTIFICATION DEVICE

This is a continuation of application Ser. No. 07/588,994, filed on Sep. 26, 1990, which was abandoned upon the filing hereof.

BACKGROUND OF THE INVENTION

1. Field of the Invention

This invention relates to a transponder in a vehicle device on the vehicle side identification.

2. Description of the Related Art

As a conventional vehicle identification device, devices such as shown in Japanese Unexamined Utility Model Publication No. 57-159180 or Japanese Unexamined Patent Publication No. 61-201179 are well known.

In these conventional vehicle identification devices, a transponder, also called an identification tag (tag in short) modulates an unmodulated microwave transmitted from an interrogator with an ID code stored in a memory means provided in the tag and returns the modulated microwave back to the interrogator. Information inherent to a certain vehicle on which the tag is mounted is thus reported to the interrogator.

One example of the construction of a conventional vehicle identification device is shown in FIG. 1.

In FIG. 1, the conventional vehicle identification device is provided with an interrogator 1 and a tag 2. The interrogator 1 transmits an unmodulated microwave generated from a microwave oscillator 10 from an antenna 13 through a circulator 11 and demodulates the microwave received by the antenna 13 utilizing a demodulator 12 to output the demodulated microwave.

The tag 2 is designed so as to enable an electric power source 23 for a modulator 25 and a ROM 24 to be switched ON only when the unmodulated microwave transmitted from the interrogator 1 is received by the antenna 21 and detected by a detector 22, in order to prevent excess consumption of electric power of a battery.

Thus, when the electric power source 23 is ON, the tag modulates the microwave thus received in response to a coded signal stored in the ROM 24 and transmits back the modulated microwave to the interrogator 1.

In the conventional technology as shown in FIG. 1, the tag is generally required to have a detecting antenna 21, a detector 22, and an electric power source controlling circuit 23, in addition to a modulating antenna 26 and a modulator 25, to perform its inherent operation.

Among these components, the detecting antenna 21 modulating antenna 26 and the detector 22 and modulator 25 constitute distributed constant circuits. Therefore, it is difficult to minimize the size thereof to that of another lumped constant circuit.

Especially, the antennas 21 and 26 are required to have at least a predetermined area to obtain a gain high enough to operate the tag normally and thus the area occupied by these antennas is the largest among those of other components in the tag.

Accordingly, it is difficult to minimize the size of the tag remarkably in a conventional tag having two antennas.

The object of the present invention is to overcome these technological problems in the conventional tag and to provide a tag with a minimized size.

SUMMARY OF THE INVENTION

To attain the object of the present invention, there is provided transponder for a vehicle identification device in which a radio wave including vehicle information returned from a transponder provided in each vehicle is received by an interrogator. Each vehicle transponder comprises an antenna for receiving a query radio wave transmitted from the interrogator, a detection device for detecting the query radio wave received by the antenna, a coded signal generating means for generating a coded signal train, previously stored, in response to a detection output from the detection device, and a bias controlling means for varying an amount of the bias of the detection device in accordance with the coded signal train output from the coded signal generating means and for varying a reflection coefficient of the detection device in accordance with the coded signal train so that the coded signal train is returned to the interrogator as a responding radio wave generated by modulating the reflected wave of the query radio wave.

The transponder for a vehicle identification device of the present invention receives and detects a query radio wave and generates a previously memorized coded signal train in response to the detection output.

After that, this coded signal train causes a change in the reflection coefficient of the detector, whereby the reflected wave of the query radio wave is transmitted back to the interrogator as a modulated radio wave.

The present invention is characterized in that the reflection coefficient is varied by varying the amount of bias of the detection device.

DESCRIPTION OF THE PREFERRED EMBODIMENTS

Figure 1:
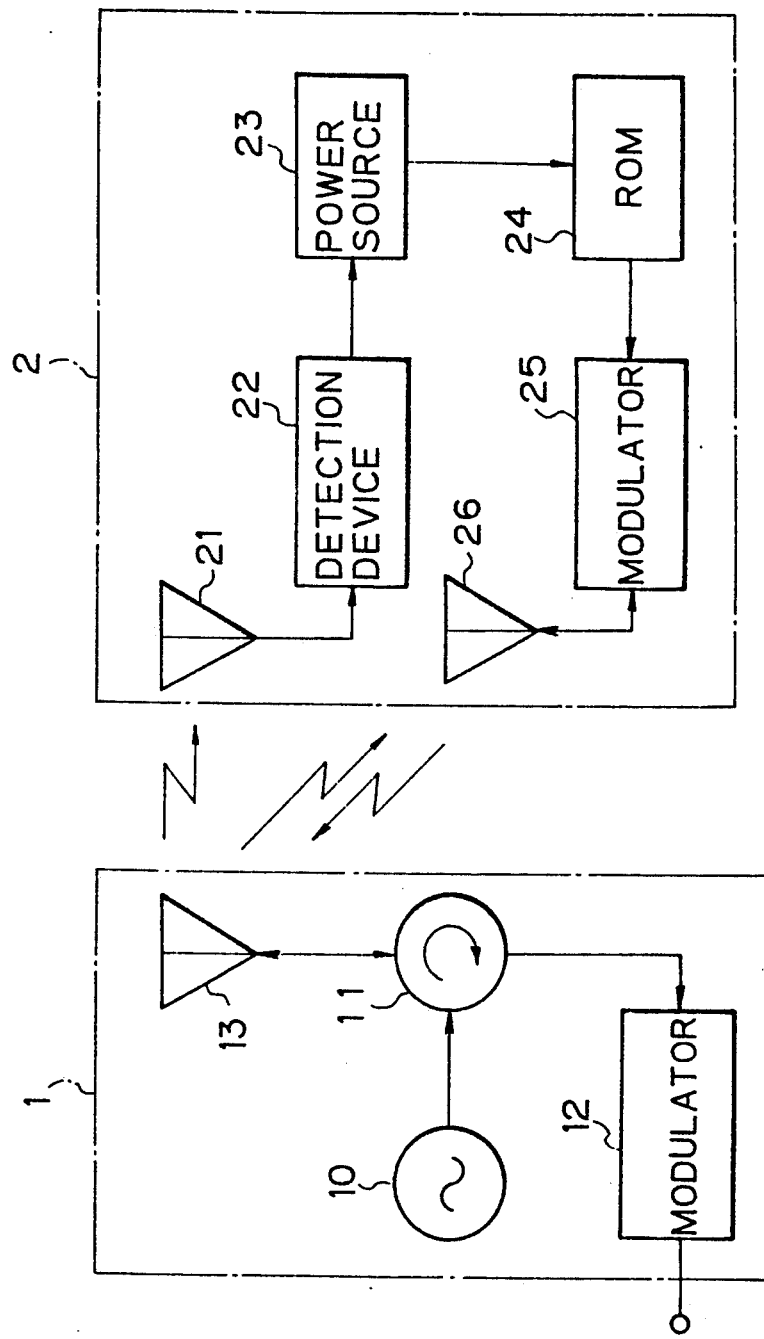
FIG. 1 is a block diagram of a construction of a conventional vehicle identification device.

The preferred embodiments of the present invention will be explained with reference to the attached drawings hereunder.

As stated above, the basic technological feature of the present invention is that a transponder, i.e., tag, comprising an antenna 210 for receiving a query radio wave transmitted from the interrogator 1, a detection device 230 for detecting the query radio wave received by the antenna 210, a coded signal generating means 290 for generating a coded signal train, previously stored, in response to a detection output generated from the detection device 230, and a bias controlling means 232 for varying an amount of the bias of the detection device in accordance with the coded signal train output from the coded signal generating means 290 and for varying a reflection coefficient of the detection device 230 in accordance with the coded signal train so that the coded signal train is returned to the interrogator 1 as a responding radio wave generated by modulating the reflected wave of the query radio wave.

Figure 2:
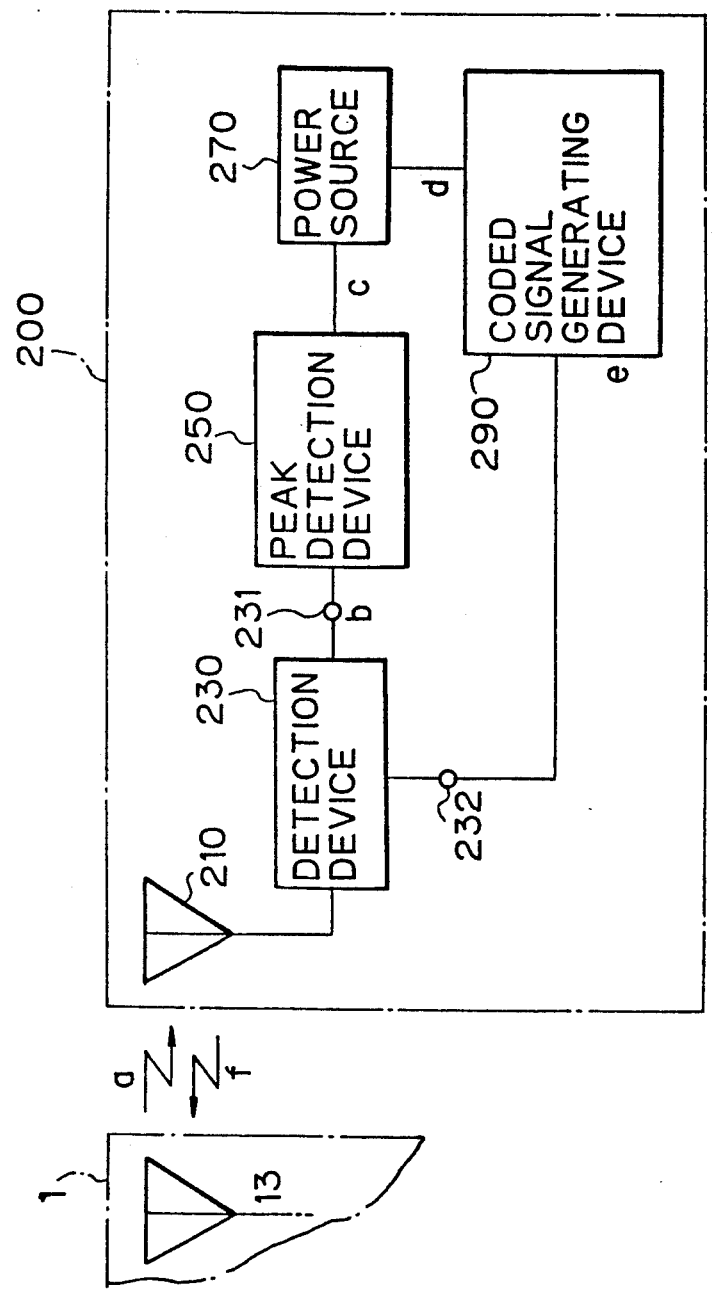
FIG. 2 is a block diagram of a construction of one embodiment of a vehicle identification device of the present invention.

This feature is embodied in the block diagram of FIG. 2, in which a tag 200 is provided with an antenna 210 which is commonly used for detecting and modulating a radio wave, a detection device 230 having an output terminal 321 from which a negative voltage is output when a microwave is detected and a bias input terminal 232, an electric power source controlling circuit 270 which can supply electric power to a coded signal generating means 290 when an input voltage exceeds a certain threshold voltage Vth thereof, and a coded signal generating means 290 generating a modulating signal in response to an ID code previously stored in a certain memory.

In this embodiment, the coded signal generating means 290 also serves as a bias controlling means connected to the bias terminal 232.

Figure 3:
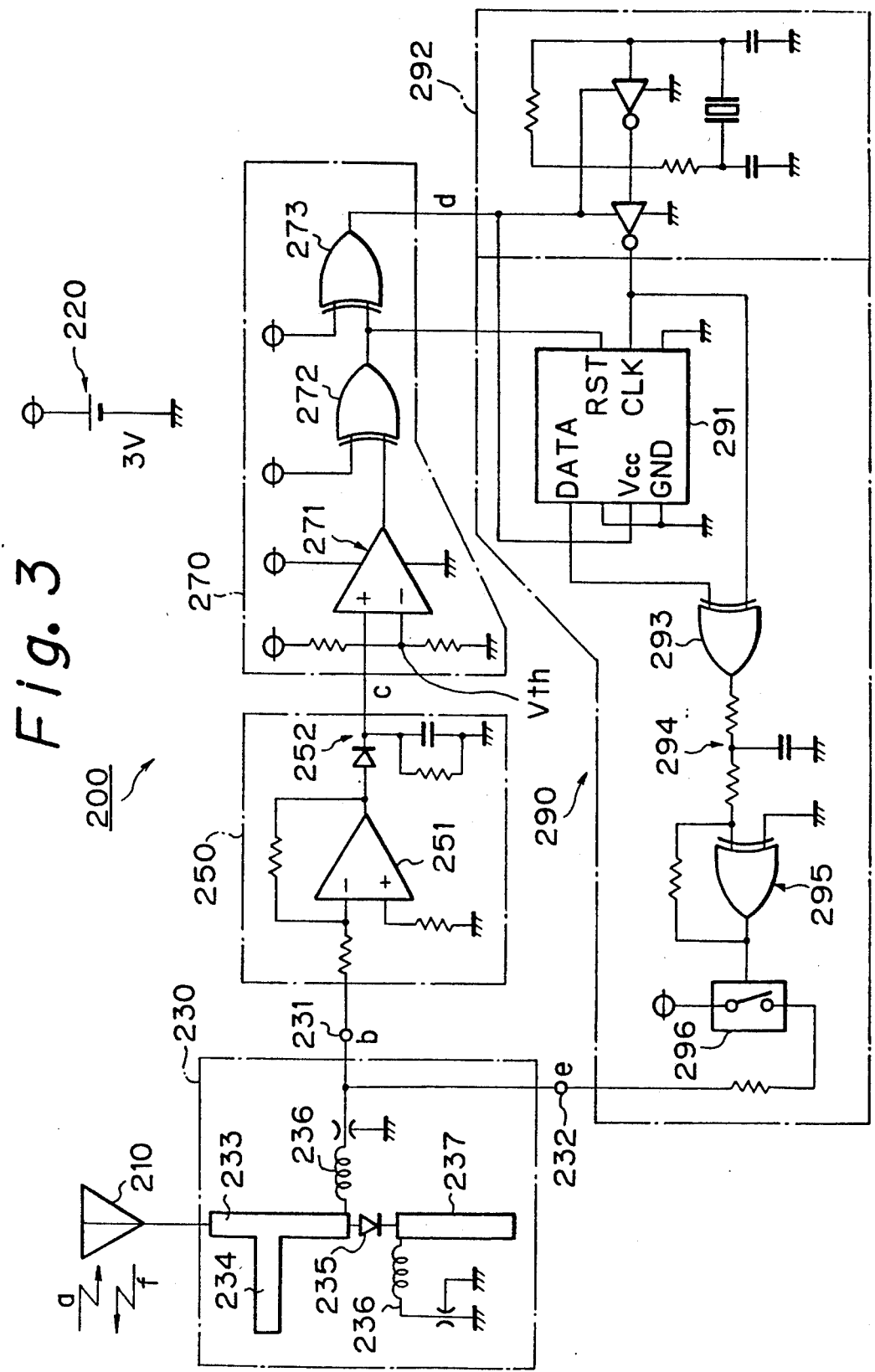
FIG. 3 shows a circuit used in the embodiment shown in FIG. 2.

FIG. 3 shows the detailed circuit of one embodiment of a tag of the present invention. In that figure, the antenna 210 and the detection device 230 constitute a distributed constant circuit of a micro strip line.

The detection device 230 is provided with a 50Ω line 233, a stub 234 for matching an input signal, a Schottky barrier diode 235, a low-pass filter for generating a DC bias and for outputting a detection output, and a short termination for a high frequency wave having a wavelength of $\lambda/4$ (wherein $\lambda$ is a line wavelength).

In this embodiment, a modulating function is given to a detection device, which is conventionally used only for detecting purposes, without changing the basic construction of the detection device itself.

Note that, in this embodiment, the bias current to the Schottky barrier diode 235 is changed by applying the modulated signal to the bias input terminal 232, whereby a reflection microwave is modulated by the amplitude modulation method utilizing variation of the reflection coefficient of the detection diode 235 in response to the variation of the bias current.

According to this embodiment, since the detection device 230 has a modulating function, a modulator and a modulating antenna, necessary components in a conventional detection device, can be omitted, so the size of the distributed constant circuit of the tag can be reduced to a half of that in a conventional detection device.

While, in this embodiment, since a modulating signal should be superimposed on a detection output signal when the modulating operation is carried out, a circuit for eliminating the modulated signal component from the detection output is required.

Toward this end, in this embodiment, a peak detecting means 250 comprising an inverting amplifier 251 and an envelope detection circuit 252 is provided in the tag.

When the output voltage of the peak detecting means 250 exceeds a threshold voltage Vth of a comparator 271 in the electric power source controlling means 270, electric power is supplied to a ROM 291 and clock oscillator 292, whereby transmission of the ID code is started.

In this situation, the electric power is input to an input terminal Vcc of the ROM 291 through a gate circuit 273, whereby the ROM 291 starts to transmit the ID code therefrom in response to a reset signal input to a terminal RST through a gate circuit 272.

The ID code is output from a terminal DATA in synchronization with a clock signal input to a terminal CLK.

The waveform of the ID code thus output therefrom is shaped through a gate circuit 293, a low-pass filter 294, and an amplifier 295 and then input to a bias terminal 232 of the detection device through a switching circuit 296.

The switching circuit 296 is provided to obtain a necessary bias current for the detecting diode 235.

In this embodiment, the ID code, i.e., a coded signal, may be used in a form of a coded signal train or the like and the coded signal train is previously prepared in accordance with an inherent coded signal of the transponder mounted on the individual vehicle.

The operation of this embodiment will be explained with reference to FIGS. 2 to 4 hereunder.

Figure 4:
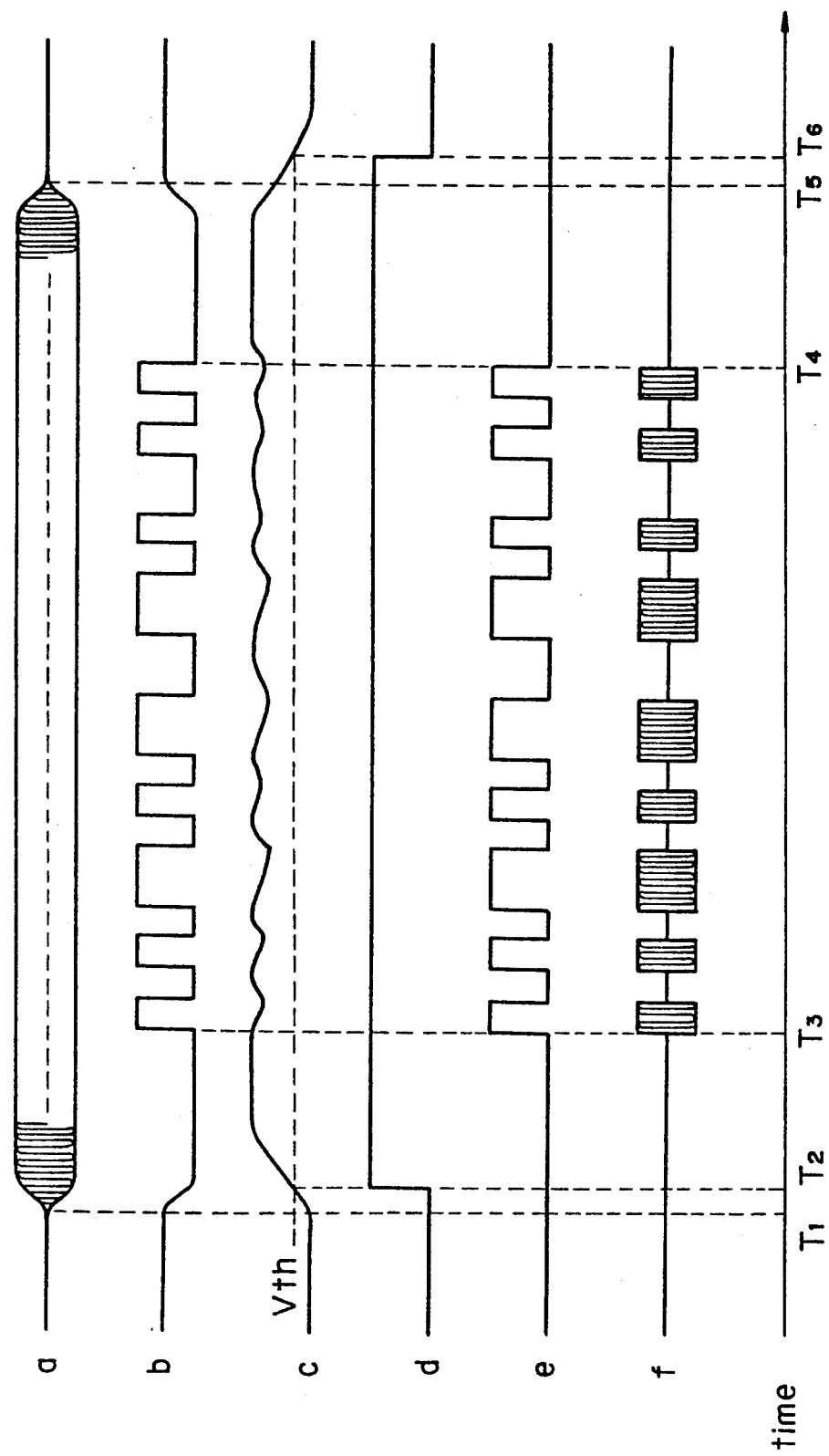
FIG. 4 is a timing chart illustrating an operation of the embodiment shown in FIG. 2.

FIG. 4 is a timing chart indicating the signal level of each component used in this embodiment as shown in FIGS. 2 and 3.

In FIG. 4, a denotes an unmodulated microwave transmitted from the interrogator and b denotes a detection output of the detection device 230.

Further, c, d, and e denote an output of the peak detector 250, an output of the electric power source controlling circuit 270, and a modulated signal modulated by the ID code output from the ROM 291, respectively.

f denotes a modulated microwave transmitted back from the tag to the interrogator.

In that figure, when a tag 200 comes into a identifying area of the interrogator 1 and receives an unmodulated microwave at a time $T_1$, a negative voltage as shown in the waveform b is output from the detection output terminal 231.

When a signal c generated by invertedly amplifying the detection output b exceeds a certain threshold voltage level at a time $T_2$, the output of the electric power source controlling means 270 is turned ON, whereby the ROM 291 and the clock generating circuit 292 start to operate.

After the ROM 291 outputs the ID code at a time $T_3$, the reflection coefficient of the detection diode 235 is varied and thus the reflected wave f is modulated by an amplitude modulating method.

In this system, although the detection output signal b is also varied due to the variation of the bias of the detection diode 235, the variation can be absorbed by a peak detecting circuit 250 and no adverse effect is given to the electric power signal d.

The modulating operation is ended at the time $T_4$.

Then, after the tag 200 gets out from the identifying area at the time $T_5$ and a predetermined time for keeping the signal of the peak detection device 250 has passed at the time $T_6$, the electric power source is turned OFF to result in a waiting condition for the next detecting operation.

As explained above, in this embodiment, a microwave received by the antenna 210 is modulated by amplitude modulation in two conditions, i.e., a reflecting condition and an absorbing condition, utilizing variation of the reflection coefficient caused by the variation of the bias current in the detection diode 235.

Then, the thus absorbed microwave is detected and used for maintaining the power source.

Accordingly, in this embodiment, a function equivalent to that of a conventional tag can be realized by a microwave circuit having only one antenna and one diode and thereby a cheaper tag having a smaller size compared with that of a conventional one can be produced.

In this embodiment shown in FIG. 3, although a Schottky barrier diode is used as the detection diode 235, any kind of device having both a detecting function and a function by which the reflection coefficient is varied in response to a bias current, for example, a transistor, can be used to constitute a tag having the same function as explained above.

Instead of using the peak detection device 250, the electric power source controlling circuit 270, and the coded signal generating means 290, in order to obtain a tag a having the same function as explained above, a computer circuit, i.e., CPU circuit, can be used, in which a certain software program under which the circuit is operated for a predetermined time duration after a detection signal is input therein for outputting the ID code associated therewith.

In the embodiment of the present invention as explained above, only the ID code is read out from the tag, but the present invention can be applied to a tag having a function to write signals therein.

Figure 5:
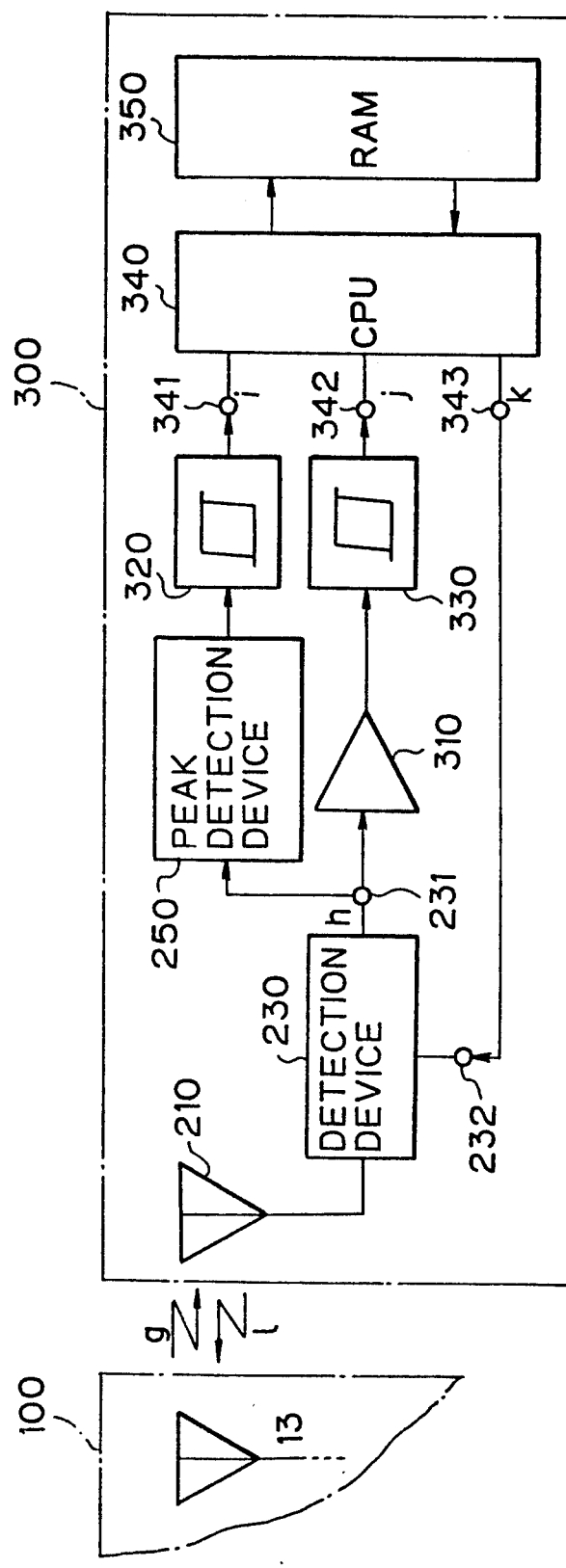
FIG. 5 is a block diagram of a construction of another embodiment of a vehicle identification device of the present invention.

FIG. 5 is a block diagram of another embodiment of the present invention.

In that figure, components common to FIG. 2 carry the same reference numerals as used in FIG. 2, and the explanations thereof are omitted.

In FIG. 5, an interrogator 100 has a function for modulating a microwave with amplitude modulation and transmitting the thus modulated signal.

While, a tag 300 is provided with an AC amplifier 310, comparators 320 and 330, CPU 340, and a RAM 350.

The CPU 340 is further provided with a switching control terminal 341 for switching an operation mode, an input terminal 342 for inputting write data thereinto, and an output terminal 343 for outputting a modulated signal.

Figure 6:
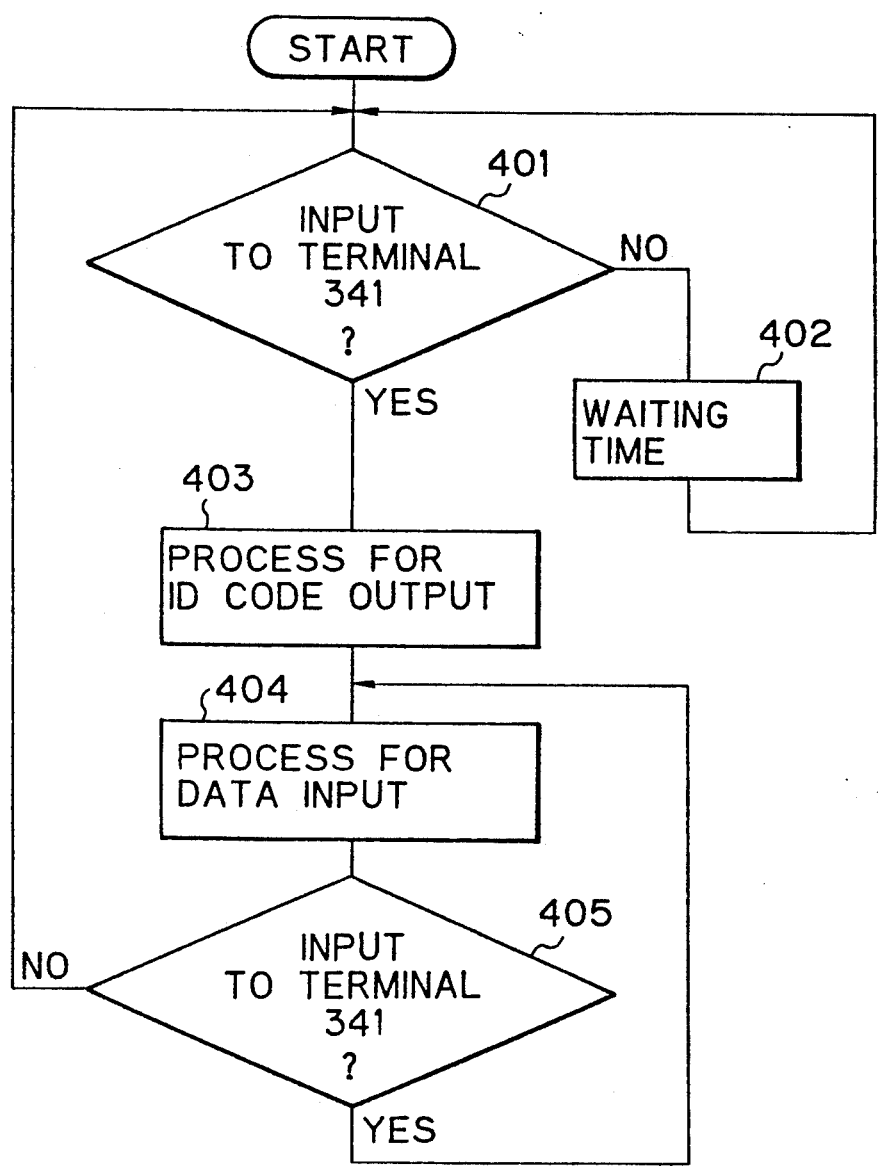
FIG. 6 is a flow chart of the operation of the other embodiment shown in FIG. 5.

The CPU 340 has a program as shown in FIG. 6, in which when the terminal 341 is turned OFF, the operation mode thereof is switched to a waiting mode (power saving mode) carried out along steps 401 and 402, while when it is turned ON, the operation mode thereof is switched to an operation mode in which an ID code is transmitted at step 403, and then switched again to a receiving mode carried out along steps 404 and 405.

The operation of the tag of the embodiment shown in FIG. 5 will be explained with reference to the timing chart of FIG. 7 hereunder.

The sections g to 1 illustrate waveform signals at corresponding portions in FIG. 6.

Figure 7:
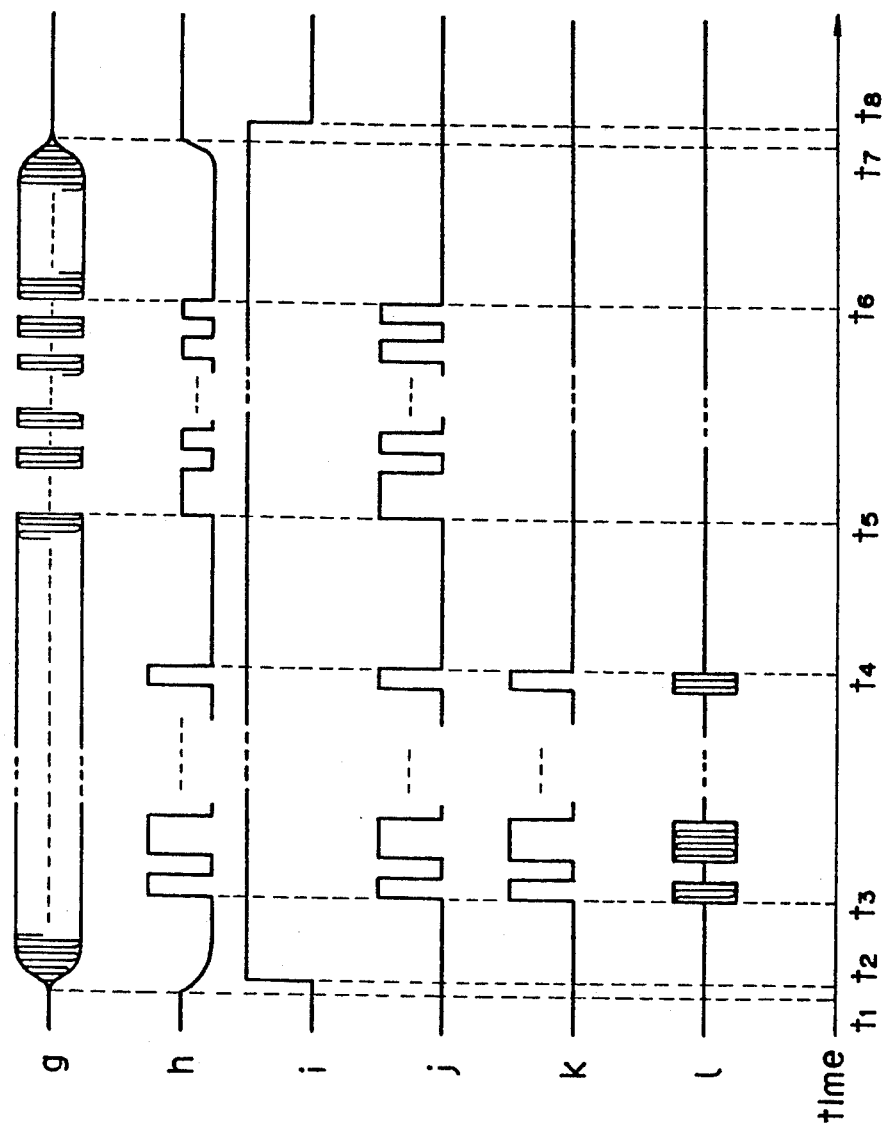
FIG. 7 is a time chart of the operation of the other embodiment shown in FIG. 5.

As shown in FIG. 7, the interrogator 100 is continuously transmitting an unmodulated microwave therefrom until a response from the tag 300 is received.

When the tag 300 entered into a discriminating area of the interrogator 100 at a time $T_1$, the CPU starts to operate at time $T_2$.

During the time $T_3$ to $T_4$, the tag modulates the microwave thus received with an ID code thereof and transmits the modulated microwave to the interrogator 100.

The interrogator 100, receives which the microwave modulated by the ID code from the tag 300, modulates the microwave with an amplitude modulation in response to writing data starting from the time $T_5$ and transmits the thus AM modulated microwave to the tag again.

The tag 300 receives and detects the AM modulated microwave to rewrite the corresponding data in the RAM 350.

Thereafter, the tag 300 moves out of the identifying area of the interrogator 100 at the time $T_6$, and the CPU is placed into a waiting mode after a predetermined time for keeping the peak value of the peak detector device 250 has passed.

As explained above, in this embodiment, a data writable tag can be obtained utilizing a microwave circuit having only one antenna and one detection device therein.

According to the present invention, one antenna can be commonly used for an antenna to receive an query radio wave and for to transmit a reflected radio wave modulated in accordance with a coded signal train.

Further, in the present invention, remarkable effects in which the size of the transponder can be significantly minimized can be obtained.

While the invention has been described in terms of certain preferred embodiments, the skilled worker practiced in the art will recognize that there are various changes, modifications, omissions and substitutions that may be made without departing from the spirit thereof.

We claim:

1. A transponder used in a mobile body identification system in which an interrogator generates a query radio wave to a mobile body and receives a radio wave including mobile body information returned from a transponder provided on said mobile body, said transponder comprising:

an antenna for receiving a query radio wave transmitted from said interrogator to activate a code signal generating means and to modulate a signal, and for transmitting a modulated radio wave to said interrogator;

a detection device for detecting said query radio wave received by said antenna and for generating a detection signal;

coded signal generating means for generating a coded signal train output previously stored in response to said detection signal, and bias controlling means for varying an amount of bias of said detection device in accordance with said coded signal train output and for varying a reflection coefficient of said detection device in accordance with said coded signal train output so that said coded signal train output is returned to said interrogator as a responding radio wave generated by modulating said reflected wave of said query radio wave;

an electric power source controlling means for supplying the electric power to said coded signal generating means when a detection output having a level exceeding a predetermined set level is detected; and a circuit for eliminating a modulated component modulated by said bias controlling means and which is superimposed on said detection output generated from said detection device to preclude transmitting the modulated wave, such as a second harmonic wave.

2. A transponder for a vehicle identification device according to claim 1, wherein said coded signal train is previously prepared in accordance with an inherent coded signal of a respective transponder.

3. A transponder for a vehicle identification device according to claim 1, wherein said eliminating circuit eliminates an adverse effect caused by said modulated component by detecting said detection output from said detection device, interposed with said modulated component modulated by said bias controlling means, utilizing an enveloped line detecting method.

4. A transponder for a vehicle identification device according to claim 1, wherein said detection device is a Schottky barrier diode.

5. A transponder for a vehicle identification device according to claim 1, wherein said radio wave is a microwave.

6. A transponder provided on a vehicle and used in a vehicle identification device in which information of said vehicle is read by an interrogator utilizing a microwave in a non-contacting transponder, said transponder comprising:

an antenna for receiving a query microwave transmitted from said interrogator, a detection device including a detection device for detecting said query microwave received by said antenna and a bias terminal to give a bias voltage to said detection device, a coded signal generating means for generating a coded signal train previously determined with respect to said information as a modulating signal in response to a detection output generated from said detection device and for applying said modulating signal to said bias terminal to vary the amount of said bias of said detection device so as to vary a reflection coefficient of said detection device in accordance with said coded signal train and to modulate a reflected wave of said query microwave with amplitude modulation (AM) in accordance with said coded signal train to return it back to said interrogator through said antenna;

wherein said transponder is further provided with an electric power source controlling circuit for supplying electric power to said coded signal generating means in response to a detection output generated from said detection device; and wherein said transponder is further provided with a circuit for eliminating a modulated component caused by said modulated signal output from said coded signal generating means and superimposed on a detection output generated from said detection device to preclude transmitting the modulated wave, such as a second harmonic wave, and wherein said electric power source controlling circuit supplies electric power to said coded signal generating means in response to a detection output with a modulated component thereof being eliminated by said eliminating circuit.

7. A transponder for, a vehicle identification device according to claim 6, wherein said transponder is further provided with an electric power source controlling circuit for supplying electric power to said coded signal generating means in response to a detection output generated from said detection device.

8. A transponder for vehicle identification device according to claim 7, wherein said transponder is further provided with a circuit for eliminating a modulated component caused by said modulated signal output from said coded signal generating means and superimposed on a detection output generated from said detection device and wherein said electric power source controlling circuit supplies electric power to said coded signal generating means in response to a detection output with a modulated component thereof being eliminated by said eliminating circuit.

9. A transponder for a vehicle identification device according to claim 6, wherein said eliminating circuit detects said detection output generated from said detection device to which modulated components caused by said modulated signal output from said coded signal generating means are superimposed by an envelope detection method.

10. A transponder for a vehicle identification device in which information is transmitted between an interrogator and transponders provided on vehicles utilizing microwaves, each of said transponder comprising:

a detector comprising an antenna for receiving a query microwave generated from said interrogator, a detection device, and a bias terminal for biasing said detection device, said detector functioning such that said query microwave received by said antenna is modulated with amplitude modulation (AM) in two conditions such as a reflecting and absorbing condition, a reflection wave of said modulated query microwave is returned back to said interrogator from said antenna as a responding microwave, then said microwave thus received is detected, a coded signal generating means for outputting predetermined coded signal trains as a modulating signal in response to said vehicle information and varying an amount of bias of said detection device in response to said coded signal train by applying said modulating signal to said bias terminal, whereby a reflection coefficient of said detection device is varied in response to said coded signal train, a circuit for eliminating modulated components by said modulating signal generated from said coded signal generating means and superimposed on a detection output detected by said detector, from said detection output, to preclude transmitting the modulated wave, such as a second harmonic wave, and an electric power source controlling means for supplying electric power to said coded signal generating means in response to said detection output, said modulated components thereof being eliminated therefrom by said eliminating circuit to give operating time for said coded signal generating means.

* * * * *